(12) United States Patent
Fushiki et al.

(10) Patent No.: US 10,214,107 B2
(45) Date of Patent: Feb. 26, 2019

(54) CONTROLLER FOR VEHICLE

(71) Applicant: TOYOTA JIDOSHA KABUSHIKI KAISHA, Toyota-shi, Aichi-ken (JP)

(72) Inventors: Shunsuke Fushiki, Susono (JP); Toshio Inoue, Gotemba (JP); Keita Fukui, Fujinomiya (JP); Tomoaki Honda, Gotemba (JP); Hidekazu Nawata, Gotemba (JP); Yuta Niwa, Mishima (JP); Taichi Osawa, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 298 days.

(21) Appl. No.: 15/103,122

(22) PCT Filed: Nov. 26, 2014

(86) PCT No.: PCT/IB2014/002564
§ 371 (c)(1),
(2) Date: Jun. 9, 2016

(87) PCT Pub. No.: WO2015/087120
PCT Pub. Date: Jun. 18, 2015

(65) Prior Publication Data
US 2016/0375773 A1    Dec. 29, 2016

(30) Foreign Application Priority Data

Dec. 11, 2013    (JP) .................................. 2013-256032

(51) Int. Cl.
*B60L 1/00* (2006.01)
*B60W 30/188* (2012.01)
(Continued)

(52) U.S. Cl.
CPC ............. *B60L 1/006* (2013.01); *B60W 20/15* (2016.01); *B60W 20/16* (2016.01); *B60W 20/18* (2016.01);
(Continued)

(58) Field of Classification Search
CPC . B60L 1/006; B60L 2240/44; B60W 30/1886; B60W 20/16; B60W 20/18;
(Continued)

(56) References Cited

U.S. PATENT DOCUMENTS 9,718,372 B2 *  8/2017  Teraya .................... B60L 1/006
2008/0185197 A1 *  8/2008  Nakamura et al. .... B60K 6/445
                                                           701/112

(Continued)

FOREIGN PATENT DOCUMENTS

| JP | 2000-234539 A | 8/2000 |
| JP | 2001-231106 A | 8/2001 |
| JP | 2011-098633 A | 5/2011 |

*Primary Examiner* — Dale W Hilgendorf
(74) *Attorney, Agent, or Firm* — Hunton Andrews Kurth LLP

(57) ABSTRACT

An ECU includes: a control section for controlling an engine such that the engine is operated in an intermediate load state during electric power feed to the outside of a vehicle; a learning section for learning a control parameter based on a detected state quantity; and a determination section for determining whether a learning condition that the learning section learns the control parameter is established. When the learning condition is established during the electric power feed from the electric power feed section to the outside of the vehicle, the engine is controlled such that a state thereof is changed from the intermediate load state to either an idle state or a low load state, and the control parameter regarding the engine in the idle state or the low load state is learned.

15 Claims, 10 Drawing Sheets

(51) Int. Cl.
*B60W 20/16* (2016.01)
*B60W 20/18* (2016.01)
*B60W 30/18* (2012.01)
*B60W 10/06* (2006.01)
*B60W 20/15* (2016.01)
B60K 6/445 (2007.10)
B60W 50/00 (2006.01)
B60L 3/00 (2019.01)
B60L 3/12 (2006.01)
B60L 11/12 (2006.01)
B60L 11/14 (2006.01)
B60L 11/18 (2006.01)

(52) U.S. Cl.
CPC .. *B60W 30/18054* (2013.01); *B60W 30/1886* (2013.01); *B60K 6/445* (2013.01); *B60L 3/0023* (2013.01); *B60L 3/0046* (2013.01); *B60L 3/12* (2013.01); *B60L 11/123* (2013.01); *B60L 11/14* (2013.01); *B60L 11/1816* (2013.01); *B60L 11/1861* (2013.01); *B60L 2210/10* (2013.01); *B60L 2210/40* (2013.01); *B60L 2240/12* (2013.01); *B60L 2240/421* (2013.01); *B60L 2240/423* (2013.01); *B60L 2240/44* (2013.01); *B60L 2240/441* (2013.01); *B60L 2240/443* (2013.01); *B60L 2240/445* (2013.01); *B60L 2240/545* (2013.01); *B60L 2240/547* (2013.01); *B60L 2240/549* (2013.01); *B60L 2240/662* (2013.01); *B60L 2240/80* (2013.01); *B60L 2250/26* (2013.01); *B60L 2260/46* (2013.01); *B60W 10/06* (2013.01); *B60W 2050/0088* (2013.01); *Y02T 10/6217* (2013.01); *Y02T 10/6239* (2013.01); *Y02T 10/6269* (2013.01); *Y02T 10/642* (2013.01); *Y02T 10/7005* (2013.01); *Y02T 10/705* (2013.01); *Y02T 10/7044* (2013.01); *Y02T 10/7072* (2013.01); *Y02T 10/7077* (2013.01); *Y02T 10/7216* (2013.01); *Y02T 10/7241* (2013.01); *Y02T 10/7291* (2013.01); *Y02T 90/127* (2013.01); *Y02T 90/14* (2013.01); *Y02T 90/16* (2013.01); *Y10S 903/905* (2013.01)

(58) Field of Classification Search
CPC .......... B60W 30/18054; B60W 10/06; B60W 20/15; Y02T 10/6269
See application file for complete search history.

(56) References Cited

U.S. PATENT DOCUMENTS

| | | | |
|---|---|---|---|
| 2008/0227590 A1* | 9/2008 | Kimura et al. | B60K 6/445 477/3 |
| 2010/0133900 A1* | 6/2010 | King | B60L 1/006 307/9.1 |
| 2011/0139096 A1* | 6/2011 | Niimi | B60K 6/445 123/2 |
| 2014/0311426 A1* | 10/2014 | Yamazaki | B60K 6/445 123/2 |

* cited by examiner

CONTROLLER FOR VEHICLE

CROSS-REFERENCE TO RELATED APPLICATIONS

This is a national phase application based on the PCT International Patent Application No. PCT/162014/002564 filed Nov. 26, 2014, claiming priority to Japanese Patent Application No. 2013-256032 filed Dec. 11, 2013, the entire contents of both of which are incorporated herein by reference.

1. FIELD OF THE INVENTION

The present invention relates to a controller for a vehicle and in particular to a controller for a vehicle that includes an electric power feed section for feeding electric power to the outside of a vehicle.

2. DESCRIPTION OF RELATED ART

In recent years, plug-in hybrid vehicles that can be charged from a commercial electric power supply have been commercially available. A plug-in hybrid vehicle that feeds electric power to electrical equipment, an electric power network, or the like on the outside of the vehicle has been suggested (for example, see Japanese Patent Application Publication No. 2001-231106 (JP 2001-231106 A)).

Meanwhile, feedback control for operating an internal combustion engine in a proper state is executed in an internal combustion engine. It has been suggested that, in order to increase accuracy of this feedback control, a controller learns control parameters that are used for the control of the internal combustion engine. When the learned control parameters are reflected to the operation of the internal combustion engine, fuel economy can be improved, for example.

As an example, an apparatus for an internal combustion engine that is disclosed in Japanese Patent Application Publication No. 2011-98633 (JP 2011-98633 A) includes: learning means for learning an idle control amount when a condition for an idle operation of the internal combustion engine is satisfied, the idle control amount being a control amount when the internal combustion is operated in idle; and control means for controlling the internal combustion engine. When the idle control amount has not been learned in the past, the control means controls the internal combustion engine such that the internal combustion engine is operated in idle for a first specified time period. When the idle control amount has been learned in the past, the control means controls the internal combustion engine such that the internal combustion engine is operated in idle for a second specified time period that is shorter than the first specified time period.

In the plug-in hybrid vehicle, the proper state of the internal combustion engine can differ between a time period during electric power feed to the outside of the vehicle and a time period during traveling. Thus, in order to increase the accuracy of the feedback control, the control parameters need to be learned for each of the time period during electric power feed to the outside of the vehicle and the time period during traveling. However, compared to a general hybrid vehicle, the operation of the internal combustion engine during traveling is less frequent in the plug-in hybrid vehicle. Therefore, an opportunity to learn the control parameters, which should be learned during traveling, is low.

In addition, such application of the plug-in hybrid vehicle is assumed that electric power is fed to electrical equipment and the like on the outside of the vehicle while the vehicle remains to be parked for a long time period, for example, at a site that has been struck with a disaster. In such a situation, the opportunity to learn the control parameters, which should be learned during traveling, is unavailable. Thus, when the vehicle travels thereafter, values of the control parameters may be changed from the values that have been obtained before the vehicle was parked. In this case, there is the possibility that the internal combustion engine cannot be operated in the proper state for traveling.

SUMMARY OF THE INVENTION

The present invention provides a controller for a vehicle that can maintain an internal combustion engine in an proper state for traveling, the controller for a vehicle being provided in the vehicle that includes an electric power feed section for feeding electric power to the outside of the vehicle.

In a controller for a vehicle according to one aspect of the present invention, the vehicle includes an internal combustion engine, a detector for detecting a state quantity about the internal combustion engine, an electric generator for generating electric power by using power of the internal combustion engine, an electrical storage device, and an outside electric power feed section for feeding the electric power at least one of generated by the electric generator or stored in the electrical storage device to the outside of the vehicle. The controller includes: a control section (an electronic control unit) for controlling the internal combustion engine such that the internal combustion engine is operated in a first operation state when the electric power is fed from the electric power feed section to the outside of the vehicle; a learning section (the electronic control unit) for learning an control amount that is used by the control section to control the internal combustion engine based on a state quantity detected by the detector; and a determination section (the electronic control unit) for determining whether or not a learning condition for the learning section to learn the control amount is established. When the learning condition is established when the electric power is fed from the electric power feed section to the outside of the vehicle, the determination section makes the control section control the internal combustion engine such that an operation state of the internal combustion engine is changed to a second operation state that differs from the first operation state, and also makes the learning section learn the control amount regarding the internal combustion engine in the second operation state.

According to the above configuration, even when the electric power is fed from the electric power feed section to the outside of the vehicle, it is possible to learn the control amount regarding the internal combustion engine in the second operation state that corresponds to a time during traveling of the vehicle. Thus, when the vehicle travels, the internal combustion engine can be operated in a proper state for traveling.

Preferably, when learning of the control amount in the second operation state is completed, the control section controls the internal combustion engine such that the operation state of the internal combustion engine returns from the second operation state to the first operation state.

According to the above configuration, after the learning of the control amount in the second operation state is completed, the state of the internal combustion engine returns to the first operation state that is proper for the electric power feed. Thus, the fuel economy during the electric power feed to the outside of the vehicle can be improved.

Preferably, the second operation state is a lower load state than the first operation state. According to the above configuration, it is possible to learn the control amount regarding the internal combustion engine during traveling that is in the lower load state than a state thereof during the electric power feed to the outside of the vehicle.

Preferably, the detector includes an airflow meter for detecting an amount of air that is suctioned into the internal combustion engine. The second operation state includes an idle state of the internal combustion engine. The learning section learns the amount of the air regarding the internal combustion engine in the idle state when the learning condition is established.

According to the above configuration, it is possible to learn the amount of the air regarding the internal combustion engine in the idle state. In this way, an intake amount can be learned when intake efficiency is degraded due to adhesion of deposits and the like to an intake passage.

Preferably, the detector includes an air-fuel ratio sensor for detecting an air-fuel ratio of exhaust gas that is discharged from the internal combustion engine. The second operation state includes either the idle state or a low load state of the internal combustion engine. The learning section learns the air-fuel ratio regarding the internal combustion engine in either the idle state or the low load state when the learning condition is established.

Since combustion stability is low in the idle state or the low load state, importance of learning of the air-fuel ratio is significant. According to the above configuration, it is possible to increase an opportunity to learn the air-fuel ratio regarding the internal combustion engine in the idle state or the low load state.

Preferably, the second operation state is a higher load state than the first operation state. According to the above configuration, it is possible to learn the control amount regarding the internal combustion engine during traveling that is in a higher load state than the state thereof during the electric power feed to the outside of the vehicle.

Preferably, the detector includes a knock sensor for detecting occurrence of knock in a cylinder of the internal combustion engine. The second operation state includes either an intermediate load state or a high load state of the internal combustion engine. The learning section learns ignition timing regarding the cylinder of the internal combustion engine in either the intermediate load state or the high load state when the learning condition is established.

The occurrence of the knock finally causes breakage of the internal combustion engine when the internal combustion engine is in either the intermediate load state or the high load state. According to the above configuration, it is possible to increase an opportunity to learn the ignition timing regarding the cylinder of the internal combustion engine in the intermediate load state or the high load state. Therefore, it is possible to suppress occurrence of the knock and the degradation of drivability.

Preferably, when a predetermined time period elapses from a timing at which the control amount is learned last time, the determination section determines that the learning condition has been established.

According to the above configuration, the learning can be carried out periodically to update the control amount. Preferably, when an index value that indicates a charged state of the electrical storage device is larger than a reference value, the determination section determines that the learning condition has not been established.

When an amount of the electric power generated by the electric generator exceeds an amount of the electric power supplied to the outside of the vehicle, an excess amount of the electric power is stored in the electrical storage device. According to the above configuration, overcharging of the electrical storage device can be prevented.

Preferably, when warming of the internal combustion engine is completed, the determination section determines that the learning condition has been established.

When the internal combustion engine is warm, the amount of the air that is required for idling is the lowest. According to the above configuration, a minimum required amount of the air can be learned. Alternatively, when the warming of the internal combustion engine has been completed, a combustion state of the internal combustion engine is stable. According to the above configuration, it is possible to learn the air-fuel ratio in the stable combustion state.

Preferably, when a temperature of the air that is suctioned into the internal combustion engine is higher than a reference value, the determination section determines that the learning condition has not been established.

According to the above configuration, when the temperature of the air that is suctioned into the internal combustion engine is higher than the reference value during parking, the ignition timing at the time differs from the ignition timing during traveling. According to the above configuration, it is possible to prevent learning of the ignition timing in a different condition than during traveling.

In a controller for a vehicle according to another aspect of the present invention, the vehicle includes an internal combustion engine, a detector for detecting a state quantity about the internal combustion engine, an electric generator for generating electric power by using power of the internal combustion engine, an electrical storage device, an electric power feed section for supplying at least one of the electric power generated by the electric generator and the electric power stored in the electrical storage device to the outside of the vehicle. The controller includes: a control section for controlling the internal combustion engine such that the internal combustion engine is operated in a first operation state during electric power feed from the electric power feed section to the outside of the vehicle; a diagnosis section for diagnosing presence or absence of a fault of the internal combustion engine or the detector based on the state quantity detected by the detector; and a determination section for determining whether a diagnosis condition for the diagnosis section to diagnose is established. When the diagnosis condition is established during the electric power feed from the electric power feed section to the outside of the vehicle, the determination section makes the control section control the internal combustion engine such that an operation state of the internal combustion engine is changed to a second operation state that differs from the first operation state, and also makes the diagnosis section diagnose the presence or absence of the fault of the internal combustion engine or the detector.

According to the above configuration, it is possible to detect the state of the internal combustion engine or the fault of the detector. Preferably, the determination section determines that the diagnosis condition is established every time the internal combustion engine is started. The diagnosis section diagnoses presence or absence of wire disconnection regarding a wire, through which a signal indicative of the state quantity is transmitted from the detector.

According to the above configuration, it is possible to increase an opportunity to diagnose the wire disconnection of the wire. Preferably, the detector includes an air-fuel ratio sensor for detecting an air-fuel ratio of exhaust gas that is discharged from the internal combustion engine. The determination section determines that the diagnosis condition is established every time the internal combustion engine is started. The diagnosis section detects a state of misfire of the internal combustion engine based on the air-fuel ratio.

According to the above configuration, it is possible to increase an opportunity to detect the state of misfire of the internal combustion engine. Preferably, the detector includes: an airflow meter for measuring an amount of air that is suctioned into the internal combustion engine; and the air-fuel ratio sensor for detecting the air-fuel ratio of the exhaust gas that is discharged from the internal combustion engine. The determination section determines that the diagnosis condition is established when fuel is fed to the internal combustion engine. The diagnosis section diagnoses the presence or absence of a fault of at least one of the airflow meter and the air-fuel ratio sensor.

Since new fuel after feeding is not deteriorated, the internal combustion engine can be started smoothly. When the state quantity that is indicated by the airflow meter or the air-fuel ratio sensor is improper despite the fact of being after feeding, the sensor is likely to be failed. Thus, according to the above configuration, it is possible to increase detection accuracy of the fault of the airflow meter or the air-fuel ratio sensor.

According to the present invention, in the vehicle that includes the electric power feed section for feeding the electric power to the outside of the vehicle, the internal combustion engine can be maintained in a proper state for traveling.

BRIEF DESCRIPTION OF THE DRAWINGS

Features, advantages, and technical and industrial significance of exemplary embodiments of the invention will be described below with reference to the accompanying drawings, in which like numerals denote like elements; and wherein.

DETAILED DESCRIPTION OF EMBODIMENTS

Figure 1:
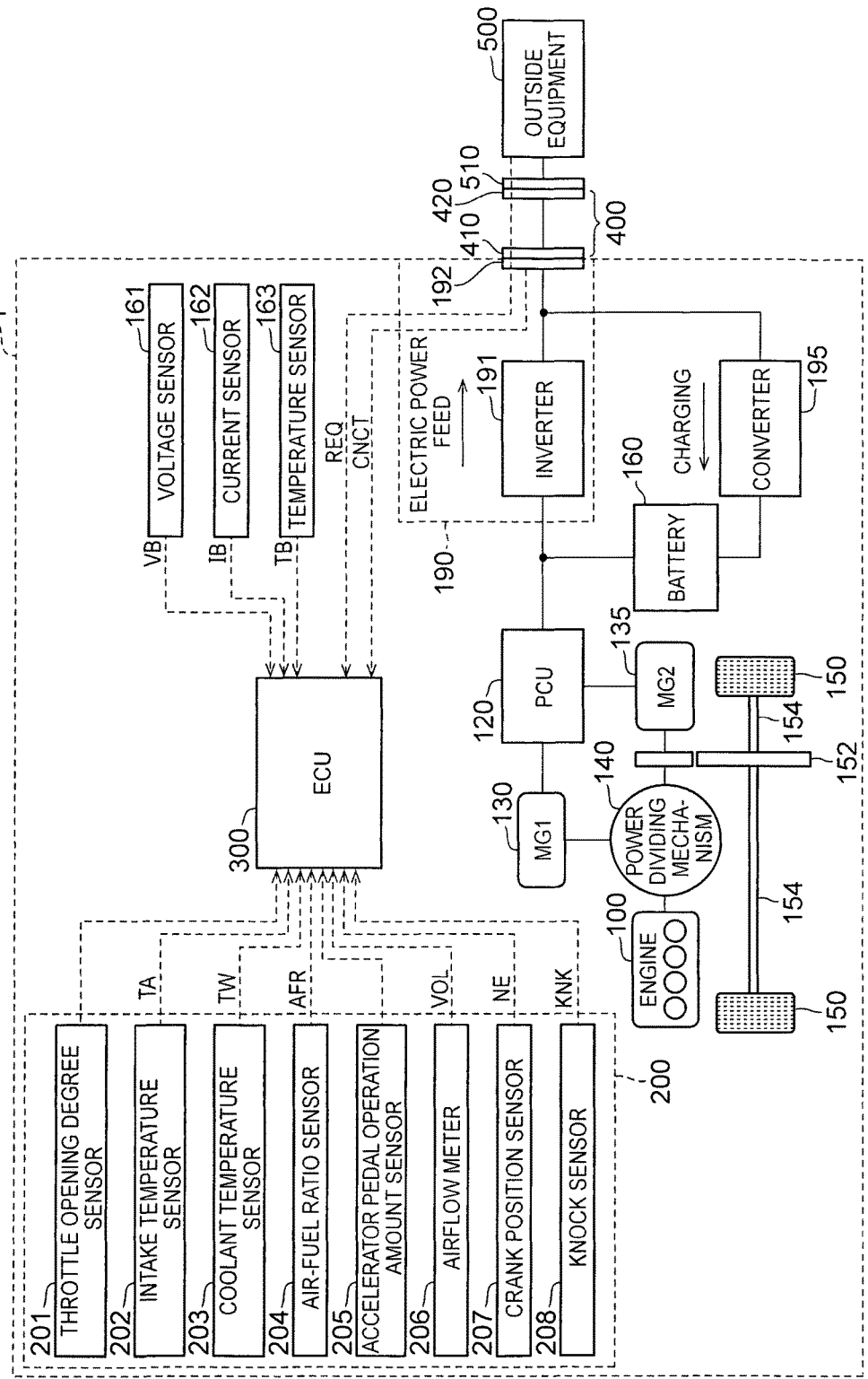
FIG. 1 is a block diagram for schematically showing a configuration of a vehicle, in which a controller according to a first embodiment of the present invention is installed.

A description will hereinafter be made on embodiments of the present invention with reference to drawings. Noted that the same or corresponding portions in the drawings are denoted by the same reference numerals, and the description thereof will not be repeated.

First Embodiment

Schematic Configuration of a Vehicle

FIG. 1 is a block diagram for schematically showing a configuration of a vehicle, in which a controller according to a first embodiment of the present invention is installed. Referring to FIG. 1, a vehicle 1 is a plug-in hybrid vehicle that is configured to be able to charge a built-in battery from the outside of the vehicle. The vehicle 1 includes an engine 100, a first motor generator 130, a second motor generator 135, a power dividing mechanism 140, drive wheels 150, a differential gear 152, a drive shaft 154, a battery 160, a detector 200, and an electronic control unit (ECU) 300.

The engine 100 is an internal combustion engine, such as a gasoline engine or a diesel engine. The detector 200 detects a state quantity about the engine 100. The ECU 300 is a controller of the vehicle 1. The ECU 300 receives signals from the detector 200 and the like and transmits control signals to components of the vehicle 1. Configurations of the engine 100, the detector 200, and the ECU 300 will be described below in detail.

Based on a control signal from the ECU 300, a power control unit (PCU) 120 boosts a DC voltage that is supplied from the battery 160, and converts boosted DC power to AC power. The AC power is supplied to the first motor generator 130 or the second motor generator 135.

The first motor generator 130 (an electric generator) uses the AC power from the PCU 120 to cause rotation of a crankshaft (not shown). Accordingly, the engine 100 is started. In addition, a drive force of the first motor generator 130 is transmitted to the drive wheels 150 via the power dividing mechanism 140, the differential gear 152, and the drive shaft 154. Furthermore, the first motor generator 130 generates electric power by using power of the engine 100 that is divided by the power dividing mechanism 140. The generated AC power is converted to the DC power by the PCU 120, and is stored in the battery 160.

The second motor generator 135 uses at least one of the AC power from the PCU 120 and the AC power from the first motor generator 130 to provide a drive force to the drive wheels 150. In addition, the second motor generator 135 generates electric power by regenerative braking. The generated electric power is converted to the DC power by the PCU 120, and is stored in the battery 160.

The battery 160 (an electrical storage device) is a DC power supply that is configured to be able to charge/discharge electric power. For the battery 160, a secondary battery such as a nickel hydrogen battery and a lithium ion battery, for example, or a capacitor such as an electric double layer capacitor can be adopted. The battery 160 is provided with a voltage sensor 161, a current sensor 162, and a temperature sensor 163. The voltage sensor 161 transmits a signal VB that indicates a voltage of the battery 160 to the ECU 300. The current sensor 162 transmits a signal IB that indicates a current of the battery 160 to the ECU 300. The temperature sensor 163 transmits a signal TB that indicates a temperature of the battery 160 to the ECU 300. Based on each of the signals, the ECU 300 computes an index value that indicates a charged state of the battery 160 (SOC: state of charge).

The vehicle 1 is configured to be able to supply electric power that is charged in the battery 160 or electric power that is generated by the first motor generator 130 to outside equipment 500. The outside equipment 500 is electrical equipment, for example. However, the outside equipment 500 is not particularly limited thereto as long as it receives the AC power from the vehicle 1 to be operated. The vehicle 1 further includes an electric power feed section 190 as a configuration for feeding electric power to the outside equipment 500. The electric power feed section 190 includes an inverter 191 and a connection portion 192.

Based on a control signal from the ECU 300, the inverter 191 converts the DC power from the battery 160 or the DC power that is generated by the first motor generator 130 to the AC power. The AC power is supplied to the connection portion 192.

The connection portion 192 is a dedicated connector, for example, and is provided on an outer surface of the vehicle 1. The electric power from the vehicle 1 is supplied to the outside equipment 500 via the connection portion 192 and a connection cable 400. The connection cable 400 includes an equipment connection 420 which connects to an equipment connection part 510.

A connector 410 of the connection cable 400 includes a connection detector (not shown). When the connector 410 is connected to the connection portion 192, the connection detector transmits a connection signal CNCT to the ECU 300. When receiving the connection signal CNCT, the ECU 300 determines that the connector 410 has been connected to the connection portion 192. In addition, the outside equipment 500 transmits an electric power feed request signal REQ when electric power feed is required. The electric power feed request signal REQ is transmitted to the ECU 300 via the connection cable 400 and the connection portion 192. When receiving the electric power feed request signal REQ, the ECU 300 determines that the electric power feed request has been made from the outside equipment 500.

Furthermore, the vehicle 1 is configured such that the battery 160 can be charged with the AC power from the outside of the vehicle 1. When the battery 160 is charged, instead of the outside equipment 500, an AC power supply (for example, a commercial electric power supply) is connected to the connection portion 192. As a configuration for charging the battery 160, the vehicle 1 further includes a converter 195. Based on a control signal from the ECU 300, the converter 195 converts the AC power from the connection portion 192 to the DC power. The DC power is stored in the battery 160.

Figure 2:
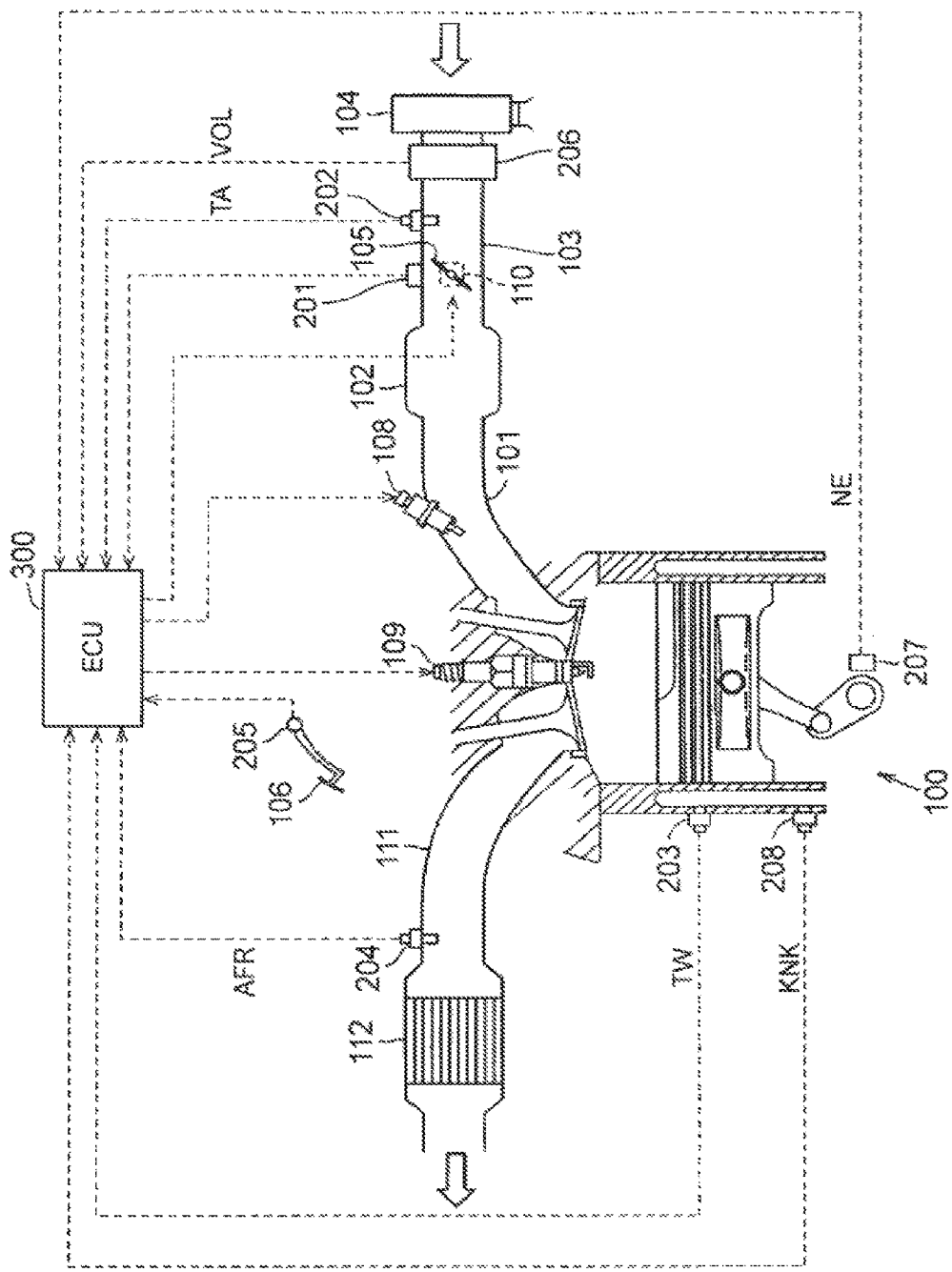
FIG. 2 is a view for illustrating details of a configuration of an internal combustion engine that is shown in FIG. 1.

FIG. 2 is a view for illustrating details of the configuration of the engine 100 that is shown in FIG. 1. Referring to FIG. 2, the engine 100 is provided with a plurality of cylinders. However, in order to avoid complexity of the drawing, only one cylinder is shown as a representative example in FIG. 2.

Each of the plural cylinders is connected to a common surge tank 102 via a corresponding intake branch pipe 101. The surge tank 102 is connected to an air cleaner 104 via an intake duct 103. A throttle valve 105 is arranged in the intake duct 103. The throttle valve 105 is configured to open or close the intake duct 103 in conjunction with depression of an accelerator pedal 106. An amount of the air that is suctioned into the engine 100 (an intake amount) is adjusted by a throttle valve 110.

Each of the cylinders is provided with an injector 108 for injecting fuel into an intake port or the intake branch pipe 101. In addition, an ignition plug 109 is provided on top of a combustion chamber. Air-fuel mixture that contains the air suctioned from the air cleaner 104 and the fuel injected by the injector 108 is introduced into the combustion chamber when an intake valve is opened. Based on a control signal from the ECU 300, the engine 100 causes ignition and combustion of the air-fuel mixture by the ignition plug 109 in the combustion chamber. When the air-fuel mixture is combusted, a piston is pushed downward due to a combustion pressure, and a crankshaft thereby rotates. The air-fuel mixture after combustion (exhaust gas) is discharged from the combustion chamber when an exhaust valve is opened. Each of the cylinders is connected to a common exhaust manifold 111. The exhaust manifold 111 is connected to a three-way catalytic converter 112. After being purified by the three-way catalytic converter 112, the exhaust gas is discharged to the outside of the vehicle. Noted that a fuel injection method is not limited to that of a port injection type, but may be of a direct injection type or a duel injector type.

The detector 200 (see FIG. 1) is provided in order to detect the state quantity of the engine 100 with the above configuration. The detector 200 includes a throttle opening degree sensor 201, an intake temperature sensor 202, a coolant temperature sensor 203, an air-fuel ratio sensor 204, an accelerator pedal operation amount sensor 205, an airflow meter 206, a crank position sensor 207, and a knock sensor 208.

The throttle opening degree sensor 201 transmits a signal that indicates an opening degree of the throttle valve 110 to the ECU 300. The intake temperature sensor 202 transmits a signal TA that indicates a temperature of the air suctioned into the engine 100 (an intake temperature) to the ECU 300. The coolant temperature sensor 203 transmits a signal TW that indicates a temperature of a coolant in a water jacket (not shown) of the engine 100 to the ECU 300.

The air-fuel ratio sensor 204 is attached to the exhaust manifold 111 that is on the upstream side of the three-way catalytic converter 112. The air-fuel ratio sensor 204 is an $O_2$ sensor, for example, and outputs a voltage that corresponds to concentration of oxygen in the exhaust gas. Due to the output voltage of the air-fuel ratio sensor 204, it is possible to detect from turning on/off of the air-fuel ratio sensor 204 whether an air-fuel ratio of the air-fuel mixture, which is combusted in the engine 100, is leaner or richer than a theoretical air-fuel ratio. Noted that a whole area air-fuel ratio sensor (a linear air-fuel ratio sensor) may be adopted for the air-fuel ratio sensor 204. The whole area air-fuel ratio sensor outputs a voltage that is proportional to the air-fuel ratio of the air-fuel mixture that is combusted in the engine 100.

The accelerator pedal operation amount sensor 205 is connected to the accelerator pedal 106, and outputs a voltage that is proportional to a depression amount of the accelerator pedal 106. The airflow meter 206 is provided in the intake duct 103. The airflow meter 206 transmits a signal VOL that indicates the intake amount to the ECU 300. The crank position sensor 207 transmits a signal NE that indicates an engine speed of the crankshaft to the ECU 300. Based on the signal from the crank position sensor 207, the ECU 300 detects a crank angle and a rotational speed of the crankshaft.

The knock sensor 208 is provided in a cylinder block of the engine 100. The knock sensor 208 is configured by including a piezoelectric element, and outputs a voltage that corresponds to a magnitude of vibration of the engine 100 to the ECU 300. Based on the voltage from the knock sensor 208, the ECU 300 controls ignition timing for each operation state of the engine 100. In the control of the ignition timing, the ignition timing is gradually advanced when knock is not detected. On the other hand, when the knock occurs, the ignition timing is adjusted to be delayed. In this way, occurrence of the knock can be suppressed, and engine output and fuel economy can be controlled properly.

Configuration of the ECU

In the ECU 300, control parameters (control amounts) are stored in advance for the intake amount, an air-fuel ratio, and the ignition timing. The ECU 300 learns the control parameters for the each operation state of the engine 100, and reflects the learned control parameters to the operation of the internal combustion engine.

Figure 3:
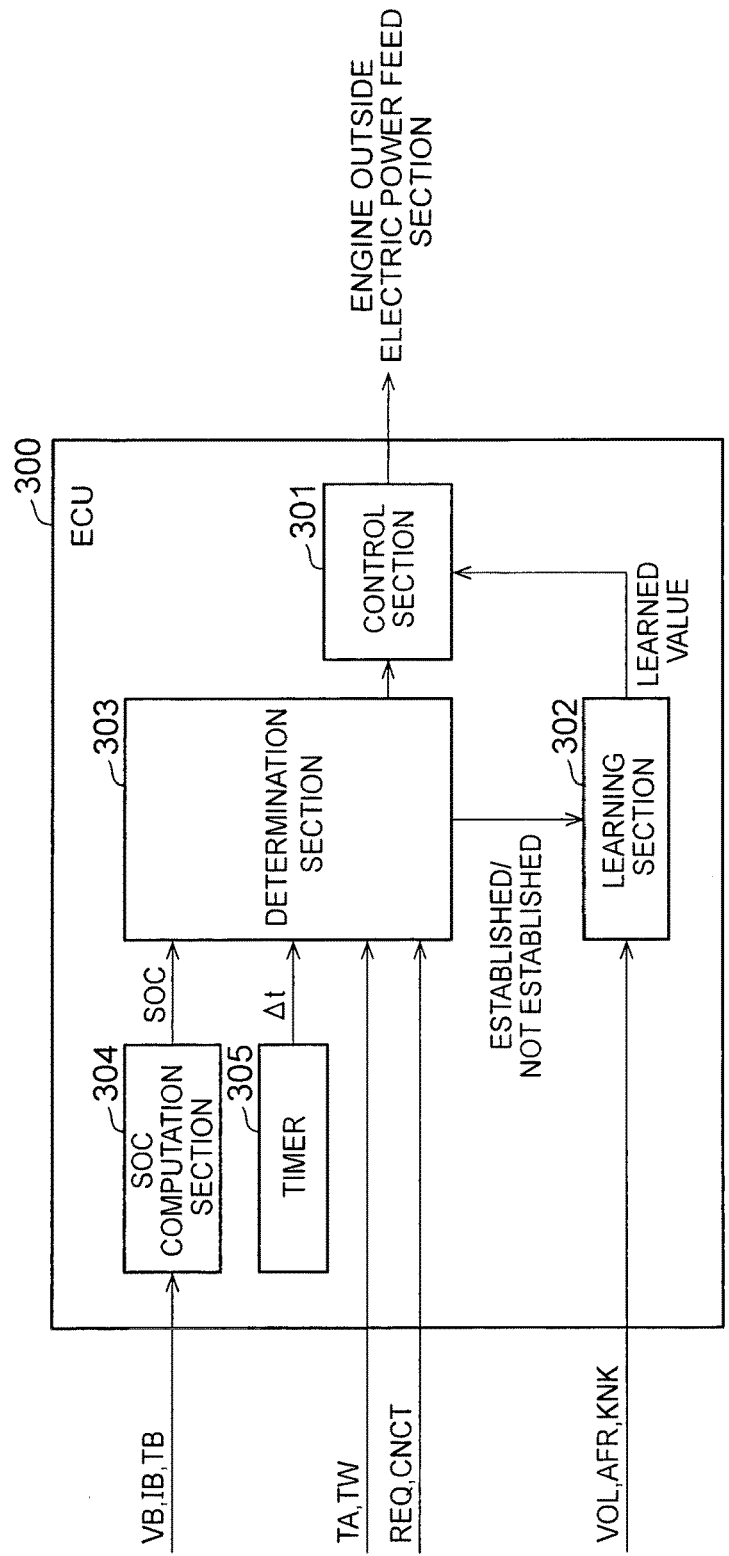
FIG. 3 is a block diagram for illustrating details of a configuration of a controller that is shown in FIG. 1.

FIG. 3 is a block diagram for illustrating details of the configuration of the ECU 300 that is shown in FIG. 1. Referring to FIG. 3, the ECU 300 includes a control section 301, a learning section 302, a determination section 303, an SOC computation section 304, and a timer 305.

Based on the signals VB, IB, TB from the sensors that are provided in the battery 160, the SOC computation section 304 computes the SOC of the battery 160. The computed SOC is output to the determination section 303. Meanwhile, the timer 305 measures a period Δt since the last time the learning section 302 learned. The period Δt is output to the determination section 303.

The determination section 303 receives the SOC from the SOC computation section 304 and the period Δt from the timer. In addition to the signal TA from the intake temperature sensor 202 and the signal TW from the coolant temperature sensor 203, the determination section 303 also receives the connection signal CNCT and the electric power feed request signal REQ. Based on these signals, the determination section 303 determines whether a learning condition for the learning section 302 to learn the control parameters is established.

The learning section 302 receives the signal VOL from the airflow meter 206, a signal AFR from the air-fuel ratio sensor 204, and a signal KNK from the knock sensor 208. When the learning condition is established, based on each of the above signals, the learning section 302 learns the intake amount, the air-fuel ratio, and the ignition timing. In other words, based on the state quantity that is detected by the detector 200, the learning section 302 learns the control parameters. The learned control parameters are reflected to the control of the engine 100 by the control section 301.

The control section 301 switches the operation state of the engine 100 by following a command from the determination section 303, and controls presence or absence of the electric power feed from the electric power feed section 190.

Operation State of the Engine

Figure 4:
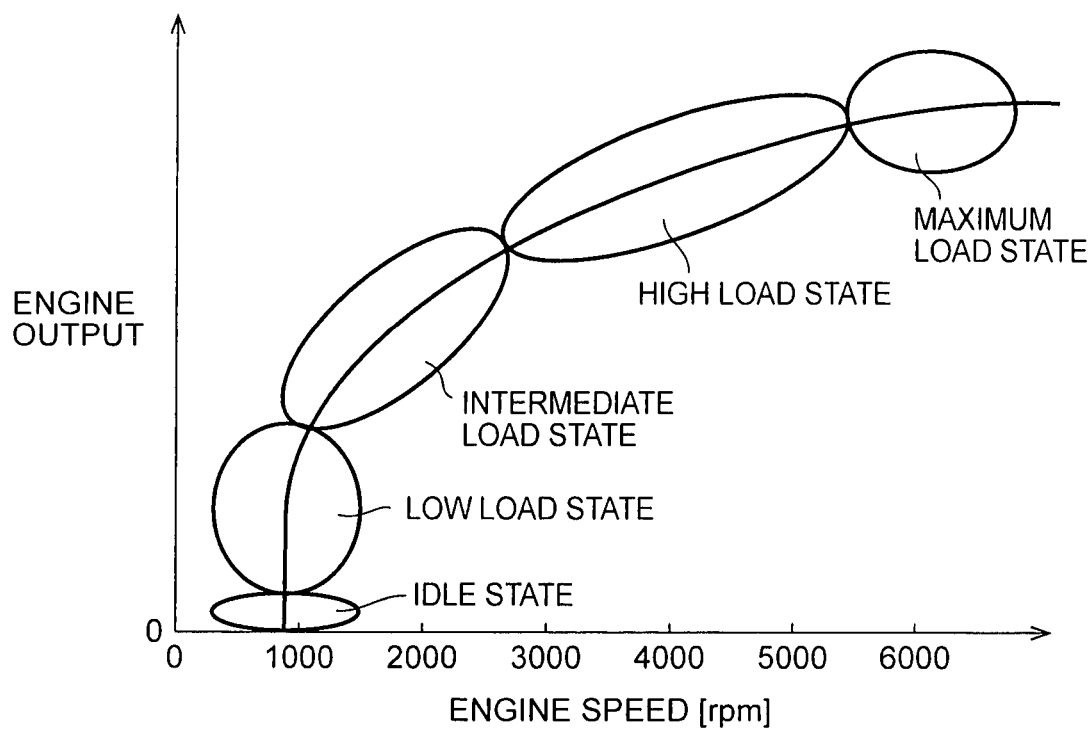
FIG. 4 is a view for illustrating an operation state of the internal combustion engine.

FIG. 4 is a graph of a performance curve of the engine 100. Referring to FIG. 4, a horizontal axis represents the engine speed. A vertical axis represents output of the engine 100. The operation state of the engine 100 can be categorized into five states, for example, in accordance with the engine speed and the engine output. However, the categorization shown below is a mere example, and a categorizing method is not limited thereto.

In an idle state, a self-sustained operation of the engine 100 is carried out. The engine speed in the idle state is about 1,000 rotations per minute (rpm), for example. The engine speed in a low load state is about 1,000 rpm, for example, and is about the same as the engine speed in the idle state. Meanwhile, the output of, the engine 100 in the low load state is larger than the output in the idle state. The engine speed in an intermediate load state is about 1,000 to 3,000 rpm, for example. The intermediate load state is used during steady traveling of the vehicle, for example. The engine speed in a high load state is 3,000 to 5,000 rpm, for example. The high load state is used during acceleration of the vehicle, for example. The engine speed in a maximum load state is at least 5,000 rpm, for example. The maximum load state is used during hill climbing or high speed traveling of the vehicle, for example.

Noted that, in the first embodiment, the intermediate load state corresponds to a "first operation state". Meanwhile, the idle state or the low load state corresponds to a "second operation state". That is, in the first embodiment, the second operation state is a lower load state than the first operation state.

A detailed description will hereinafter be made on each of the control parameters that are learned in the first embodiment. <Learning of the intake amount> An exhaust gas recirculation device (not shown) for recirculating some of the exhaust gas (hereinafter also referred to as exhaust gas recirculation (EGR)) is provided in an intake passage of the engine. EGR gas is cooled by an EGR cooler and then mixed with the intake air at an ambient temperature. In this process, water vapor in the EGR gas is condensed, and water is thereby produced. Since condensed water contains non-combusted fuel components (soot, hydrocarbon, and the like), the non-combusted fuel components are adhered to the intake passage and gradually deposited thereon. Due to deposits that are adhered to the intake passage just as described, air intake efficiency is possibly degraded. In view of this, learning about the proper intake amount is carried out periodically.

Regarding the intake amount, an amount that does not depend on the throttle opening degree needs to be learned. Thus, during the learning of the intake amount, the engine 100 is operated in the idle state. Furthermore, regarding the intake amount, a minimum required amount in the engine 100 that is operated in the idle state is preferably learned. Thus, the learning of the intake amount is carried out in a state that the engine 100 is warmed up. In order to determine whether the engine 100 has been warmed, the signal TW, which indicates a temperature of the coolant, from the coolant temperature sensor 203 can be used. When the temperature of the coolant is at least equal to a specified value (for example, 70° C.), it is determined that warming of the engine 100 has been completed.

Learning of the Air-Fuel Ratio

The fuel deteriorates with the lapse of time. In addition, a property of the fuel can differ by time or a place of feeding. For example, volatility of the fuel that is fed in the summer (summer fuel) is lower than volatility of fuel that is fed in the winter (winter fuel). In order to correspond to such deterioration and a change in the property of the fuel, learning of the air-fuel ratio needs to be carried out periodically. It is possible by learning the air-fuel ratio to suppress degradation of the exhaust gas and also to suppress a sense of discomfort that a user feels (degradation of drivability).

Regarding the learning of the air-fuel ratio, learning of a state that combustion is stabilized is preferably carried out. Thus, during the learning of the air-fuel ratio, similar to during the learning of the intake amount, the engine is operated in the warmed state. In addition, the proper air-fuel ratio differs by the operation states of the engine, such as the idle state, the low load state, and the intermediate load state. Thus, the learning of the air-fuel ratio needs to be carried out for each of the operation states of the engine. Noted that, due to a large intake amount, combustion is stabilized in the operation state of the intermediate load state or above (combustion robustness is relatively high). On the other hand, the combustion robustness is relatively low in the operation state of the low load state and below. Thus, it is important to carry out the learning of the air-fuel ratio especially for the idle state and the low load state.

Process Flow

Figure 5:
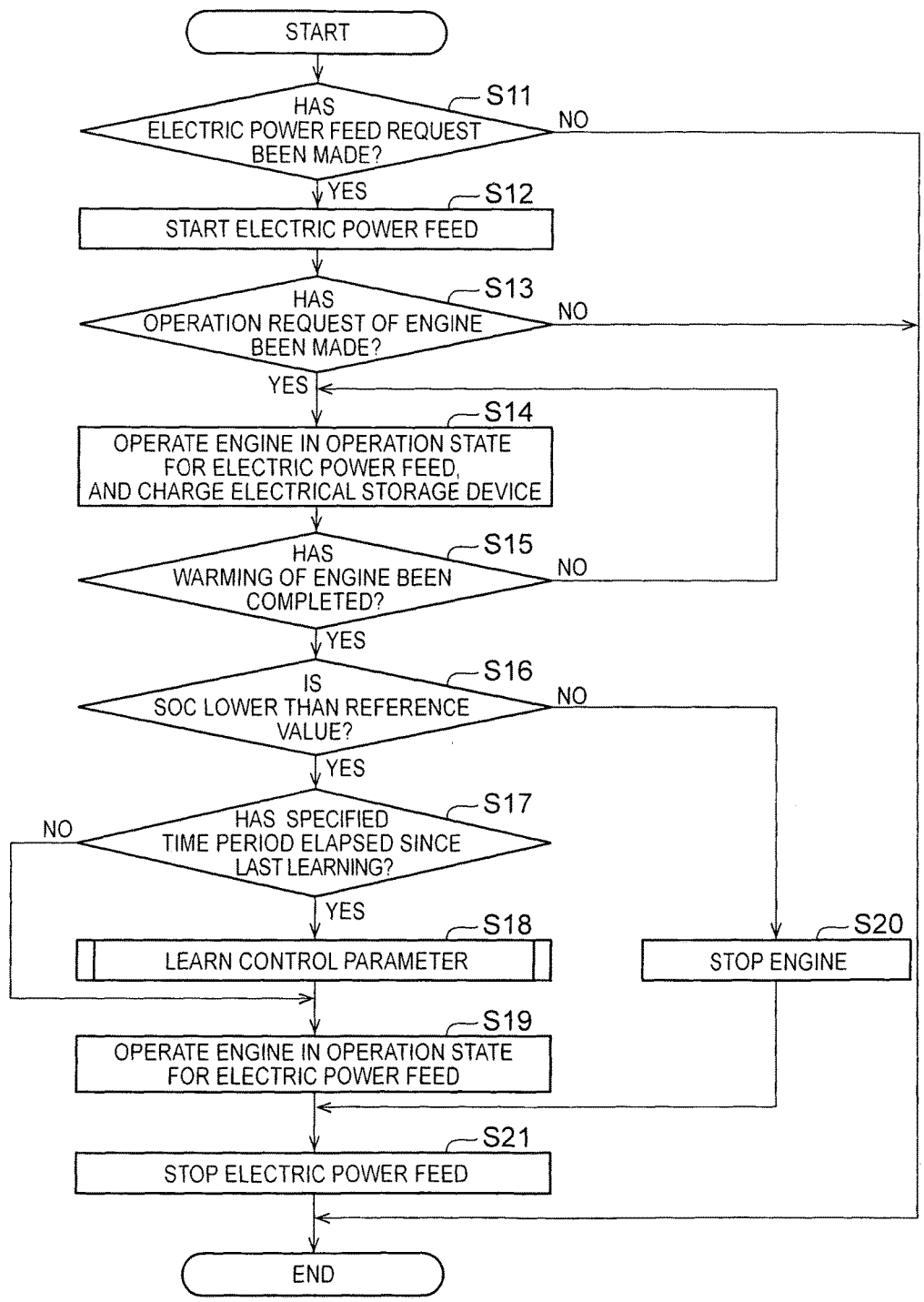
FIG. 5, is a flowchart for illustrating learning of control parameters about the internal combustion engine that is shown in FIG. 1.

FIG. 5 is a flowchart for illustrating a learning process of the control parameters of the engine 100 in the first embodiment of the present invention. Referring to FIG. 5, the process shown in this flowchart is carried out when the connection cable 400 is connected to the connection portion 192, for example. The ECU 300 can determine that the connection cable 400 has been connected to the connection portion 192 when receiving the connection signal CNCT.

In step S11, the ECU 300 determines whether an electric power feed request has been made. When receiving the electric power feed request signal REQ from the outside equipment 500, the ECU 300 determines that the electric power feed request has been made. On the other hand, when not receiving the electric power feed request signal REQ, the ECU 300 determines that the electric power feed request has not been made. If the electric power feed request has been made (YES in step S11), the process proceeds to step S12. On the other hand, if the electric power feed request has not been made (NO in step S11), a series of processes that are shown in FIG. 5 are repeated.

In step S12, the electric power feed from the battery 160 to the outside equipment 500 is started (or continued). Then, the process proceeds to step S13.

In step S13, it is determined whether an operation request of the engine 100 has been made. If the SOC of the battery 16 is at most equal to a specified value, it is determined that the operation request of the engine 100 has been made. On the other hand, if the SOC is higher than the above specified value, it is determined that the operation request of the engine 100 has not been made. If the operation request has been made (YES in step S13), the process proceeds to step S14. On the other hand, if the operation request has not been made (NO in step S13), the series of the processes are shown in FIG. 5 are repeated.

In step S14, the ECU 300 controls the engine 100 such that the engine 100 is operated in an operation state for the electric power feed. In the first embodiment, the engine 100 is operated in the intermediate load state during the electric power feed, for example. The battery 160 is charged due to the operation of the engine 100. Then, the process proceeds to step S15.

In step S15, the ECU 300 determines whether the warming of the engine 100 has been completed. If the temperature of the coolant of the engine 100, which is obtained from the coolant temperature sensor 203, is at least equal to the specified temperature (for example, 70° C.), the ECU 300 determines that the warming of the engine has been completed. On the other hand, if the temperature of the coolant is lower than the above specified temperature, the ECU 300 determines that the warming of the engine has not been completed. If the warming of the engine has been completed (YES in step S15), the process proceeds to step S16. If the warming of the engine has not been completed (NO in step S15), the process returns to step S14.

In step S16, the ECU 300 determines whether the SOC is lower than a reference value. If the SOC is lower than the reference value (YES in step S16), the process proceeds to step S17. On the other hand, if the SOC is at least equal to the reference value (NO in step S16), the process proceeds to step S20.

In step S17, the ECU 300 determines whether a specified time period has elapsed since the last time the learning was carried out. If the specified time period has elapsed since the last time the learning was carried out (YES in step S17), the process proceeds to step S18. On the other hand, if the specified time period has not elapsed since the last time the learning was carried out (NO in step S17), the process proceeds to step S19. Noted that the above specified time period is not limited to the elapsed time since the last time the learning was carried out, but may be the specified number of the electric power feed or a combination of the elapsed time and the number of the electric power feed, for example.

In step S18, the ECU 300 learns the control parameters of the engine 100. A subroutine of specific learning contents will be described below in detail.

In step S19, the ECU 300 controls the engine 100 such that the engine 100 is operated in the operation state for the electric power feed. That is, the learning of the control parameters is not carried out. It is because, when a certain time period has not elapsed since the last time the learning was carried out, the control parameters to be learned are hardly changed. Thus, necessity of learning the control parameters again is low. Then, the process proceeds to step S21.

In step S20, the ECU 300 stops the engine 100. In this way, electric power generation by the first motor generator 130 is stopped. Thus, overcharging of the battery 160 can be prevented. Then, the process proceeds to step S21.

In step S21, the electric power feed request from the outside equipment 500 is satisfied. Then, the ECU 300 stops the electric power feed from the battery 160 to the outside equipment 500. In this way, the series of the processes that are shown in FIG. 5 are completed.

As described above, all of whether the engine has been warmed, whether the SOC is lower than the reference value, and whether the specified time period has elapsed since the last time the learning was carried out correspond to the "learning conditions".

Figure 6:
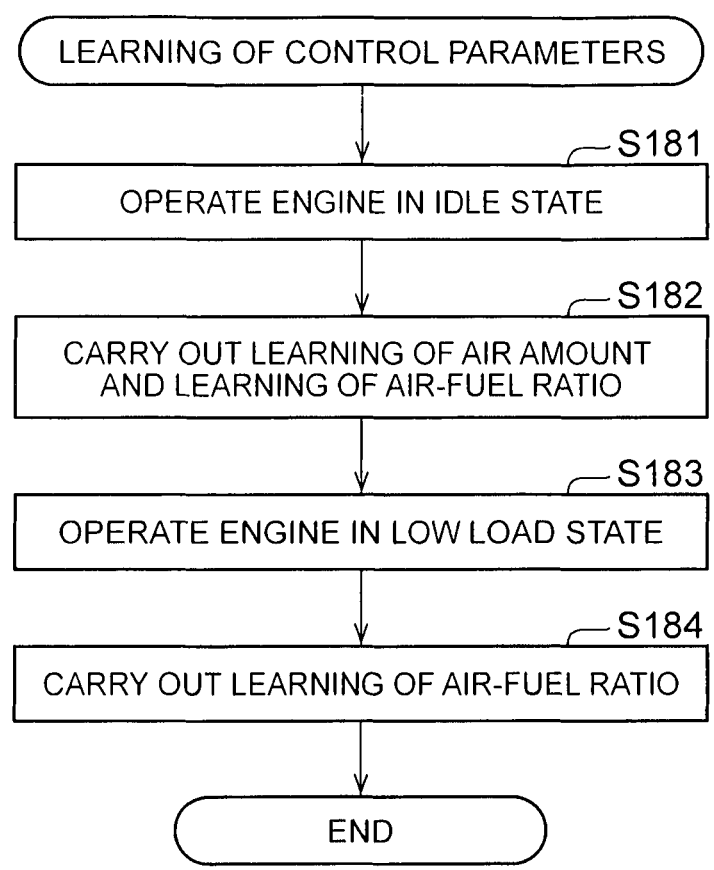
FIG. 6 is a flowchart for illustrating details of a learning process of the control parameters that is shown in FIG. 5.

FIG. 6 is a flowchart for illustrating details of a learning process of the control parameters about the engine 100 that is shown in FIG. 5 (the process in step S18). Referring to FIG. 6, as described above, the engine 100 is operated in the intermediate load state during the electric power feed to the outside of the vehicle.

In step S181, the ECU 300 controls the engine 100 such that the state thereof is changed from the intermediate load state to the idle state. In other words, during the electric power feed to the outside of the vehicle, the ECU 300 controls the engine 100 such that the state thereof is changed from the "first operation state" to the "second operation state". Then, the process proceeds to step S182.

In step S182, the ECU 300 learns the intake amount and the air-fuel ratio of the engine 100 in the idle state. Once the learning is completed, the process proceeds to step S183.

In step S183, the ECU 300 controls the engine 100 such that the state thereof is changed from the idle state to the low load state. Then, the process proceeds to step S184.

In step S184, the ECU 300 learns the air-fuel ratio about the engine 100 in the low load state. Once the learning is completed, the process returns to a main routine (proceeds to step S19 in FIG. 5).

The internal combustion engine is operated in various operation states in accordance with situations during traveling. Meanwhile, an amount of temporal change in an amount of the electric power that is requested by the outside equipment 500 is smaller than the amount of the electric power that can be generated in the first motor generator due to the operation of the engine 100 in many cases. For this reason, during the electric power feed to the outside of the vehicle, the internal combustion engine tends to be operated substantially in a constant operation state. Thus, conventionally, it is often the case that the control parameters can only be learned about any one of the operation states during the electric power feed.

On the contrary to the above, according to the first embodiment, even during the electric power feed to the outside of the vehicle, it is possible to learn the control parameters about the intake amount and the air-fuel ratio of the engine 100 in the lower load state than the state thereof during the electric power feed. In other words, it is possible to increase an opportunity to learn the control parameters about the operation state that differs from the operation state during the electric power feed. In this way, when the vehicle travels, the engine 100 can be operated in the proper state for traveling.

In addition, a large engine sound is generated when the engine is driven in the high load state despite a fact that the vehicle is parked. This possibly gives a sense of anxiety to the user as he/she thinks that a certain kind of abnormality has occurred. However, in the first embodiment, of the high load and low load states, only the low load state is learned. Thus, such an effect can be obtained that it is possible to prevent the sense of anxiety as described above from being given to the user.

Second Embodiment

Learning of the Ignition Timing

In a second embodiment, a description will be made on learning of the ignition timing. The learning of the ignition timing is carried out periodically in order to grasp the deterioration and a change in the property of the fuel. It is possible by learning the ignition timing to suppress occurrence of the knock and to suppress the degradation of drivability.

Noted that, during the electric power feed to the outside of the vehicle, the vehicle 1 is parked. Thus, travel wind for cooling the engine 100 is not generated. For this reason, when the engine 100 is changed to the high load state, the intake temperature tends to become higher than that during traveling. The ignition timing that is learned at the high intake temperature differs from the ignition timing during traveling. Thus, when the intake temperature is high (for example, when it is 50° C. to 55° C. or higher), the learning of the ignition timing is not carried out. In this way, it is possible to prevent the control parameter about the ignition timing from being updated in the state that differs from the state during traveling. Noted that, since configurations of a vehicle and an ECU according to the second embodiment are the same as the configurations of the vehicle 1 (see FIG. 1) and the ECU 300 (see FIG. 3), the detailed description thereof will not be repeated.

Figure 7:
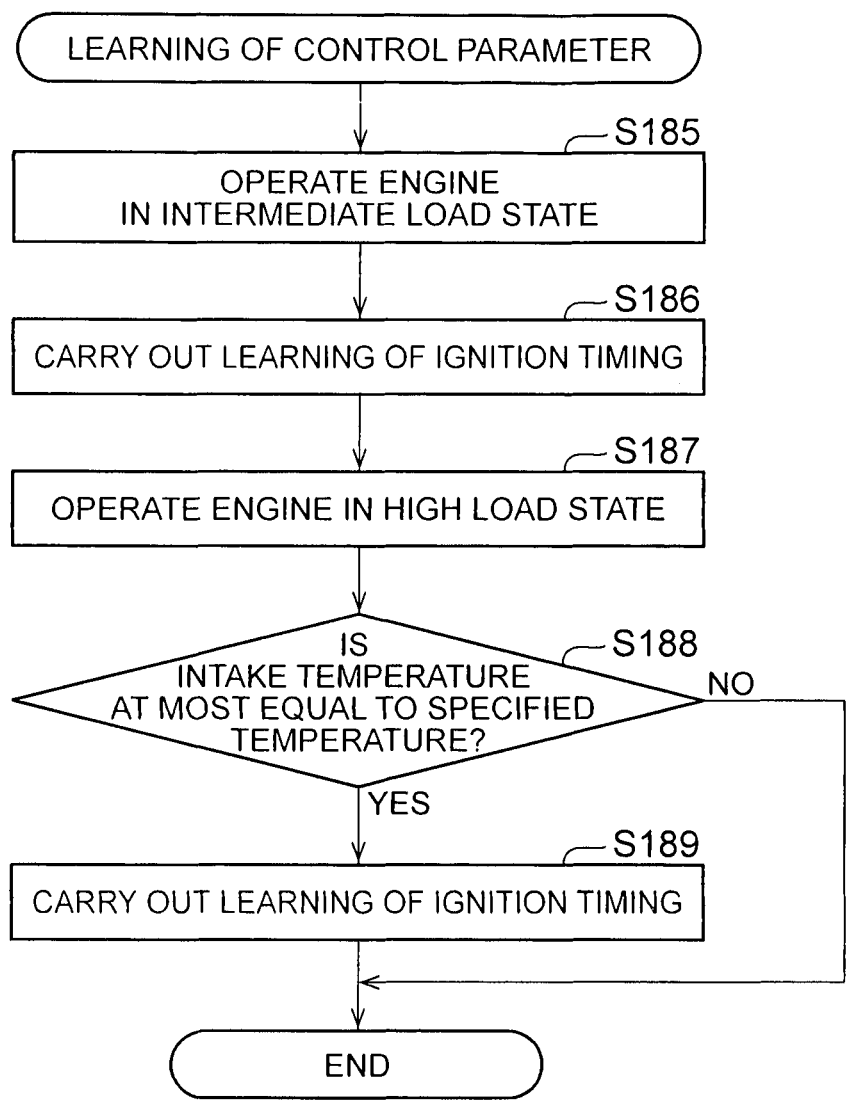
FIG. 7 is a flowchart for illustrating the details of the learning process of the control parameter in a second embodiment.

FIG. 7 is a flowchart for illustrating the details of the learning process of the control parameter about the engine 100 that is shown in FIG. 5 (the process in step S18) in the second embodiment.

Referring to FIG. 5 and FIG. 7, the process up to step S13 is the same as the process in the first embodiment. However, in the second embodiment, the operation state during the electric power feed to the outside of the vehicle is the low load state in step S14. Then, the process up to step S17 is the same as the process in the first embodiment. In the second embodiment, the process that is shown in FIG. 7 is carried out in step S18.

In step S185, the state of the engine 100 is changed from the low load state to the intermediate load state. Then, the process proceeds to step S186.

In step S186, the ECU 300 learns the ignition timing. Once the learning is completed, the process proceeds to step S187.

In step S187, the state of the engine 100 is changed from the intermediate load state to the high load state. Then, the process proceeds to step S188.

In step S188, it is determined whether the intake temperature is at most equal to a specified temperature. If the intake temperature is at most equal to the specified temperature (YES in step S188), the process proceeds to step S189. On the other hand, if the intake temperature is higher than the specified temperature (NO in step S188), the process returns to the main routine (proceeds to step S19 in FIG. 5). Noted that whether the intake temperature is at most equal to the specified temperature corresponds to the "learning condition".

In step S189, the ignition timing is learned. Once the learning is completed, the process returns to the main routine. Noted that the order of step S185 to S189 is merely one example, and thus the learning order in the intermediate load state and the high load state can be switched. In addition, the determination process of the intake temperature (the process in step S188) may be carried out every time the operation state of the engine is switched. That is, the determination process of the intake temperature may be added between step S185 and step S186.

Noted that the low load state corresponds to the "first operation state" in the second embodiment. Meanwhile, the intermediate load state or the high load state corresponds to the "second operation state". That is, in the second embodiment, the second operation state is the higher load state than the first operation state.

According to the second embodiment, even during the electric power feed to the outside of the vehicle, it is possible to learn the control parameter about the ignition timing of the engine 100 in the higher load state than the state thereof during the electric power feed. Thus, when the vehicle travels, the engine 100 can be operated in the proper state for traveling.

In the first and second embodiments, the electric power is preferably fed from the electric power feed section 190 to the outside of the vehicle even during the learning of the control parameters. A detailed description will be made below on the electric power feed during the learning of the control parameters.

Figure 8:
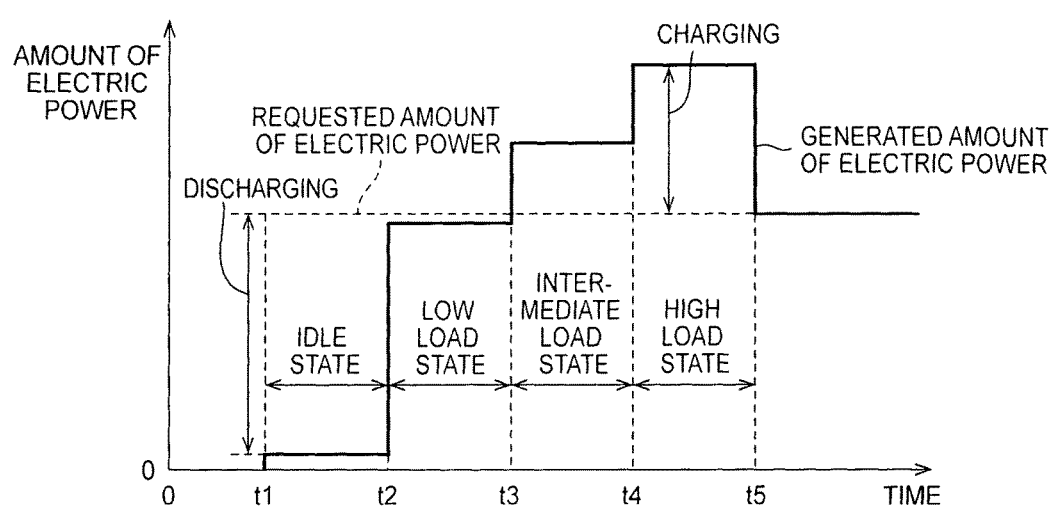
FIG. 8 is a timing chart for illustrating a relation between operation states of the engine and an amount of electric power.

FIG. 8 is a timing chart for illustrating a relation between the operation states of the engine 100 and the amount of the electric power. Referring to FIG. 8, a horizontal axis represents a time axis, and a vertical axis represents the amount of the electric power. A generated amount of the electric power and a requested amount of the electric power are respectively represented by a solid line and a broken line.

Noted that, in FIG. 8, a case where the state of the engine 100 is sequentially changed from the idle state to the high load state is illustrated. However, types and the changed order of the operation states are not limited thereto. In addition, in order to facilitate understanding, FIG. 8 shows a case where the requested amount of the electric power is constant. However, the following description is also applicable to a case where the requested amount of the electric power varies by time.

At a reference time (0), the requested amount of the electric power is zero. At time t1, the ECU 300 receives the electric power feed request. The ECU 300 controls the engine 100 such that the engine 100 is operated in the idle state. When the engine is in the idle state, the generated amount of the electric power is significantly smaller than the requested amount of the electric power. An amount of the electric power that corresponds to a difference between the requested amount of the electric power and the generated amount of the electric power is fed from the battery 160.

At time t2, the state of the engine is changed from the idle state to the low load state. In the low load state, for example, the generated amount of the electric power is slightly smaller than the requested amount of the electric power. Thus, similar to the case of the idle state, the amount of the electric power that corresponds to the difference between the requested amount of the electric power and the generated amount of the electric power is fed from the battery 160.

At time t3, the state of the engine is changed from the low load state to the intermediate load state. In the intermediate load state, for example, the generated amount of the electric power is larger than the requested amount of the electric power. The amount of the electric power that corresponds to the difference between the requested amount of the electric power and the generated amount of the electric power is stored in the battery 160.

At time t4, the state of the engine is changed from the intermediate load state to the high load state. In the high load state, for example, the generated amount of the electric power is significantly larger than the requested amount of the electric power. Thus, similar to the case of the intermediate load state, the amount of the electric power that corresponds to the difference between the requested amount of the electric power and the generated amount of the electric power is stored in the battery 160.

At time t5, the learning of the control parameters is completed. At the time t5 onward, the ECU 300 controls the engine 100 such that the generated amount of the electric power becomes equal to the requested amount of the electric power.

Third Embodiment

In a third embodiment, diagnosis of a fault part is carried out instead of the learning of the control parameters. Noted that the diagnosis of the fault part may be carried out in addition to the learning of the control parameters. An overall configuration of a vehicle according to the third embodiment differs from the overall configuration of the vehicle 1 (see FIG. 1) in a point that the ECU 300 is configured differently. The overall configuration other than that of the vehicle according to the third embodiment is the same as the overall configuration of the vehicle 1. Thus, the detailed description thereof will not be repeated.

Figure 9:
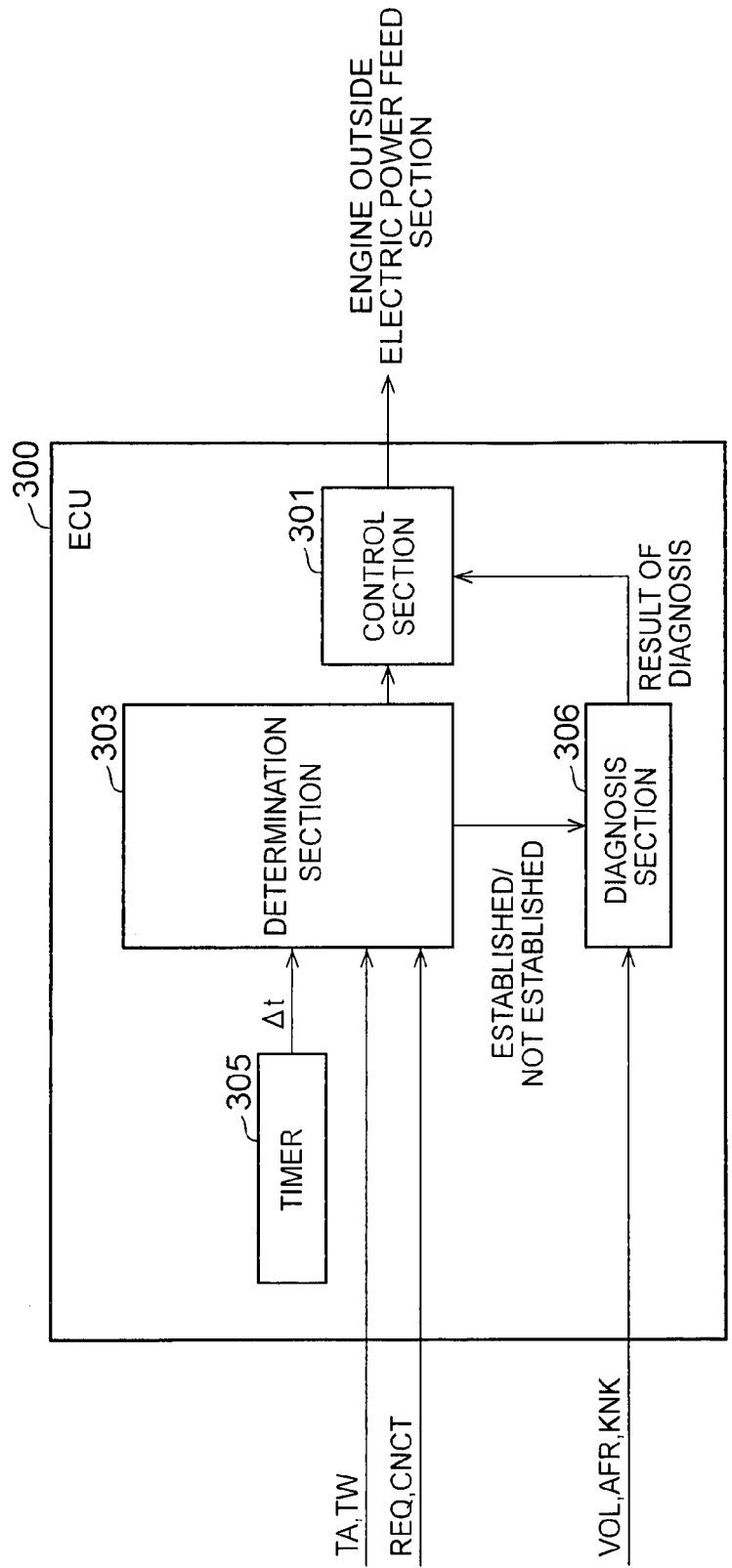
FIG. 9 is a diagram for illustrating details of a configuration of a controller according to a third embodiment of the present invention.

FIG. 9 is a diagram for illustrating details of a configuration of a controller according to the third embodiment of the present invention. Referring to FIG. 9, the ECU 300 (see FIG. 3) of the third embodiment includes a diagnosis section 306 instead of the learning section 302. The diagnosis section 306 receives each of the signals from the detector 200 (the signal VOL from the airflow meter 206, the signal AFR from the air-fuel ratio sensor 204, and the signal KNK from the knock sensor 208). When a diagnosis condition is established, the diagnosis section 306 diagnoses a fault part based on each of the above signals.

Figure 10:
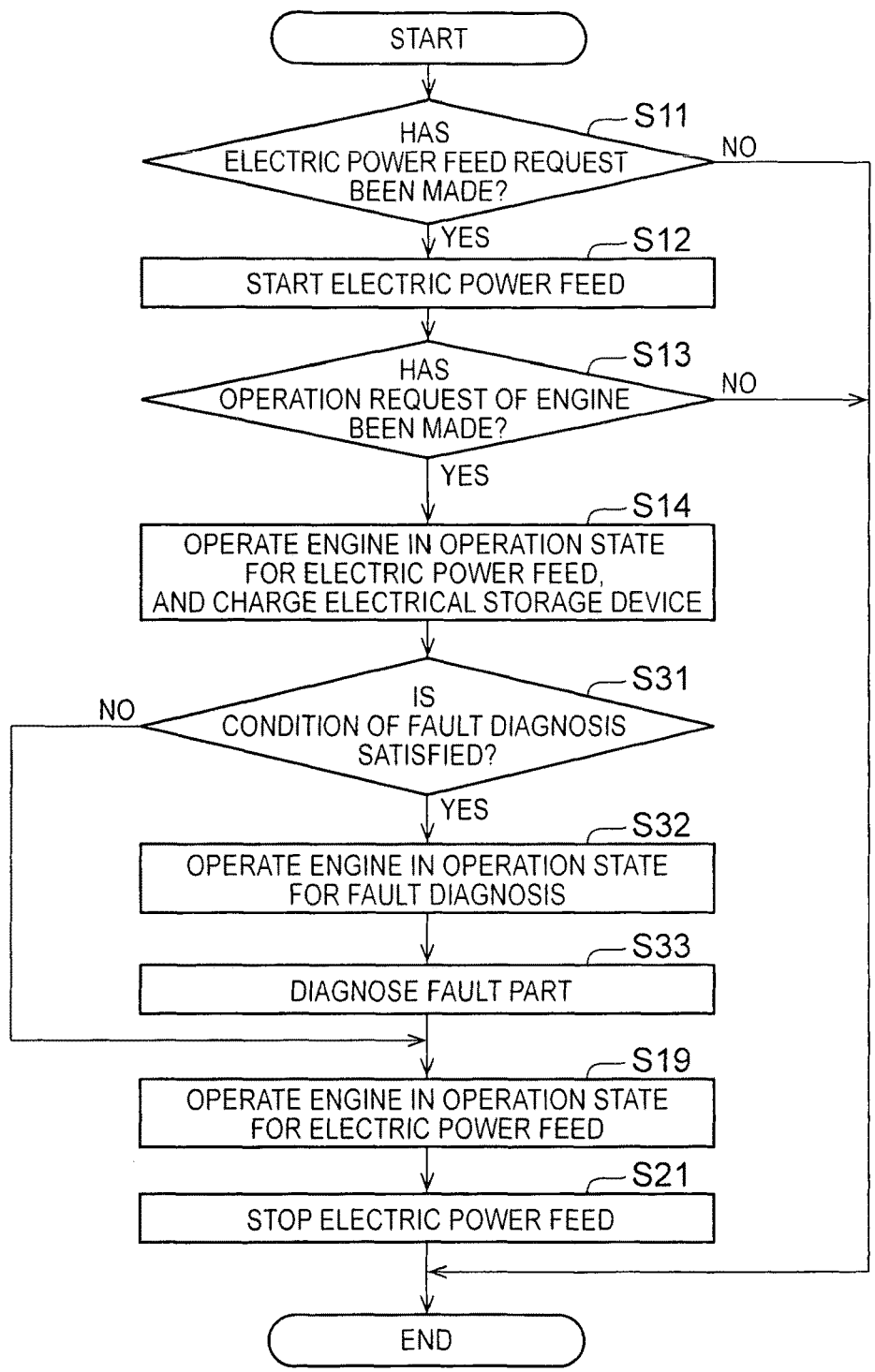
FIG. 10 is a flowchart for illustrating fault diagnosis of the internal combustion engine according to the third embodiment of the present invention.

FIG. 10 is a flowchart for illustrating control of the internal combustion engine in the third embodiment of the present invention. Referring to FIG. 10, the process up to step S14 is the same as the process up to step S14 that is shown in FIG. 5. Thus, the description thereof will not be repeated.

In step S31, the ECU 300 determines whether a condition for fault diagnosis is satisfied. If the condition of the fault diagnosis is satisfied (YES in step S31), the process proceeds to step S32. On the other hand, if the condition of the fault diagnosis is not satisfied (NO in step S31), the process proceeds to step S19.

In step S32, the ECU 300 operates the engine 100 in an operation state for the fault diagnosis. Then, the process proceeds to step S33.

In step S33, the ECU 300 carries out the fault diagnosis. The specific content of the fault diagnosis will be described below in detail. Then, the process proceeds to step S19. The process in step S19 onward is the same as the process in step S19 onward that is shown in FIG. 4. Thus, the detailed description thereof will not be repeated.

In the third embodiment, presence or absence of wire disconnection, a state of misfire, and the fault of a sensor are diagnosed. A detailed description will hereinafter be made on each of the faults with reference to FIG. 9 again.

Diagnosis of the Presence or Absence of the Wire Disconnection

The determination section 303 determines that the diagnosis condition is established every time the engine 100 is started. When the diagnosis condition is established, the diagnosis section 306 diagnoses the presence or absence of the wire disconnection regarding a wire, through which the signal indicative of the state quantity is transmitted from each of the sensors in the detector 200.

Diagnosis of the State of Misfire

The determination section 303 determines that the diagnosis condition is established every time the engine 100 is started. In this case, based on the signal AFR from the air-fuel ratio sensor, the diagnosis section 306 detects the state of misfire of the engine 100.

Diagnosis of Fault of a Sensor

The determination section 303 determines that the diagnosis condition is established when fuel is fed to the internal combustion engine. The diagnosis section 306 diagnoses presence or absence of a fault regarding the airflow meter 206 or the air-fuel ratio sensor 204. Since new fuel immediately after feeding is not deteriorated, the engine can be started smoothly. In the other way around, if the state quantity that is indicated by the airflow meter 206 or the air-fuel ratio sensor 204 is improper despite the fact of being immediately after feeding, the sensor is likely to be failed. Thus, it is possible by diagnosing the fault after feeding to increase detection accuracy of the fault of the airflow meter 206 or the air-fuel ratio sensor 204.

According to the third embodiment, it is possible to increase an opportunity to detect a state of the engine such as the state of misfire as well as the wire disconnection or the fault of each of the sensors. Noted that, when any type of abnormality is detected, the user is desirably informed of the abnormality by lighting of an abnormality indicator light, for example.

It should be understood that the embodiments disclosed herein are given as a mere illustration in all respects, but not given to impose any limitation. The scope of the present invention is defined by the scope of the claims, and is intended to include all modifications falling within the scope of the claims and equivalents thereof.

What is claimed is:

1. A controller for a vehicle, the vehicle including an internal combustion engine, a detector configured to detect a state quantity about the internal combustion engine, an electric generator configured to generate electric power by using power of the internal combustion engine, an electrical storage device, and an electric power feed device configured to feed the electric power at least one of generated by the electric generator or stored in the electrical storage device to outside of the vehicle, the controller comprising:
an electronic control unit configured to
a) control the internal combustion engine such that the internal combustion engine is operated in a first operation state when the electric power is fed from the electric power feed device to outside of the vehicle,
b) learn a control amount for controlling the internal combustion engine based on the state quantity detected by the detector,
c) determine whether or not a learning condition for learning the control amount is established, and
d) when the learning condition is established while the electric power is fed from the electric power feed device to outside of the vehicle,
i) control the internal combustion engine such that an operation state of the internal combustion engine is changed from the first operation state to a second operation state that differs from the first operation state while the electric power is fed from the electric power feed device to outside of the vehicle during both the first and the second operation states, and
ii) learn the control amount regarding the internal combustion engine in the second operation state,
wherein the second operation state is a lower load state than the first operation state.

2. The controller according to claim 1, wherein, the electronic control unit is configured to control the internal combustion engine when learning of the control amount in the second operation state is completed such that the operation state of the internal combustion engine returns from the second operation state to the first operation state.

3. The controller according to claim 1, wherein the detector includes an airflow meter that detects an amount of air suctioned into the internal combustion engine, the second operation state includes an idle state of the internal combustion engine, and the electronic control unit is configured to learn the amount of the air regarding the internal combustion engine in the idle state when the learning condition is established.

4. The controller according to claim 3, wherein, the electronic control unit is configured to determine that the learning condition is established when warming of the internal combustion engine is completed.

5. The controller according to claim 1, wherein the detector includes an air-fuel ratio sensor that detects an air-fuel ratio of exhaust gas discharged from the internal combustion engine, the second operation state is an idle state of the internal combustion engine, and the electronic control unit is configured to learn the air-fuel ratio regarding the internal combustion engine in the idle state when the learning condition is established.

6. The controller according to claim 1, wherein the detector includes an air-fuel ratio sensor that detects an air-fuel ratio of exhaust gas discharged from the internal combustion engine, the second operation state is a low operation state of the internal combustion engine, and the electronic control unit is configured to learn the air-fuel ratio regarding the internal combustion engine in the low operation state when the learning condition is established.

7. The controller according to claim 1, wherein, the electronic control unit is configured to determine that the learning condition is established when a predetermined time period elapses from a timing at which the control amount is learned last time.

8. The controller according to claim 1, wherein, the electronic control unit is configured to determine that the learning condition is established when an index value that indicates a charged state of the electrical storage device is smaller than a reference value.

9. A controller for a vehicle, the vehicle including an internal combustion engine, a detector configured to detect a state quantity about the internal combustion engine, an electric generator configured to generate electric power by using power of the internal combustion engine, an electrical storage device, and an electric power feed device configure to feed the electric power at least one of generated by the electric generator or stored in the electrical storage device to outside of the vehicle, the controller comprising:
an electronic control unit configured to
a) control the internal combustion engine such that the internal combustion engine is operated in a first operation state when the electric power is fed from the electric power feed device to outside of the vehicle,
b) learn a control amount for controlling the internal combustion engine based on the state quantity detected by the detector,
c) determine whether or not a learning condition for learning the control amount is established, and
d) when the learning condition is established while the electric power is fed from the electric power feed device to outside of the vehicle,
i) control the internal combustion engine such that an operation state of the internal combustion engine is changed from the first operation state to a second operation state that differs from the first operation state while the electric power is fed from the electric power feed device to outside of the vehicle during both the first and the second operation states, and
ii) learn the control amount regarding the internal combustion engine in the second operation state,
wherein the second operation state is a higher load state than the first operation state.

10. The controller according to claim 9, wherein the detector includes a knock sensor that detects occurrence of knock in a cylinder of the internal combustion engine, the second operation state is an intermediate operation state of the internal combustion engine, and the electronic control unit is configured to learn ignition timing regarding the cylinder of the internal combustion engine in the intermediate operation state when the learning condition is established.

11. The controller according to claim 10, wherein, the electronic control unit is configured to determine that the learning condition is not established when a temperature of air suctioned into the internal combustion engine is higher than a reference value.

12. The controller according to claim 9, wherein the detector includes a knock sensor that detects occurrence of knock in a cylinder of the internal combustion engine, the second operation state is a high operation state of the internal combustion engine, and the electronic control unit is configured to learn ignition timing regarding the cylinder of the internal combustion engine in the high operation state when the learning condition is established.

13. The controller according to claim 12, wherein, the electronic control unit is configured to determine that the learning condition is not established when a temperature of air suctioned into the internal combustion engine is higher than a reference value.

14. The controller according to claim 9, wherein, the electronic control unit is configured to determine that the learning condition is established when a predetermined time period elapses from a timing at which the control amount is learned last time.

15. The controller according to claim 9, wherein, the electronic control unit is configured to determine that the learning condition is established when an index value that indicates a charged state of the electrical storage device is smaller than a reference value.

* * * * *